United States Patent [19]

Higuchi et al.

[11] Patent Number: 5,721,771
[45] Date of Patent: Feb. 24, 1998

[54] HANDS-FREE SPEAKING DEVICE WITH ECHO CANCELER

[75] Inventors: Koji Higuchi; Takashi Shiono, both of Amagasaki, Japan

[73] Assignee: Mitsubishi Denki Kabushiki Kaisha, Japan

[21] Appl. No.: 768,943

[22] Filed: Dec. 18, 1996

Related U.S. Application Data

[63] Continuation of Ser. No. 415,981, Apr. 4, 1995, abandoned.

[30] Foreign Application Priority Data

Jul. 13, 1994 [JP] Japan .................. 6-161522

[51] Int. Cl.$^6$ ............................................. H04M 9/08
[52] U.S. Cl. ....................... 379/389; 379/390; 379/409; 379/410
[58] Field of Search .......................... 379/388, 389, 379/390, 406, 409, 410; 370/286, 288, 289

[56] References Cited

U.S. PATENT DOCUMENTS

| | | | |
|---|---|---|---|
| 4,177,361 | 12/1979 | Birck | 379/408 |
| 4,629,829 | 12/1986 | Puhl et al. | 379/390 X |
| 5,099,472 | 3/1992 | Townsend et al. | 379/390 X |
| 5,343,521 | 8/1994 | Jullien et al. | 379/410 |
| 5,353,348 | 10/1994 | Sendyk et al. | 379/410 |
| 5,398,281 | 3/1995 | Kurokawa et al. | 379/390 |
| 5,416,887 | 5/1995 | Shimada | 395/2.42 |
| 5,471,528 | 11/1995 | Reesor | 379/390 |

FOREIGN PATENT DOCUMENTS

| | | |
|---|---|---|
| 59-180552 | 12/1984 | Japan . |
| 1276947 | 11/1989 | Japan . |
| 9120149 | 12/1991 | WIPO . |
| 9219048 | 10/1992 | WIPO . |

OTHER PUBLICATIONS

*Patent Abstract of Japan*, vol. 14, No. 259 (E-0937), Jun. 5, 1990 (JP-A-02 079552).

*Primary Examiner*—Ahmad F. Matar
*Attorney, Agent, or Firm*—Rothwell, Figg, Ernst & Kurz, P.C.

[57] ABSTRACT

A hands-free speaking device is provided which is capable of removing ambient noise at the near side from the speech transmitting signal. The hands-free speaking device includes a speaker 51 for reproducing a received speech signal, a microphone 52 for outputting a speech transmitting signal, an echo canceler 55 for removing an echo 62 transmitted from the speaker to the microphone, and a voice detector 11 comprising a noise level monitoring circuit 2 for monitoring the level of the ambient noise 63 input to the microphone, a voice level monitoring circuit 3 for monitoring the level of voice signal 61 input to the microphone, and a comparator 4 for generating a signal for increasing the attenuation amount of an attenuator 10 to attenuate the transmitting speech signal when the noise level is higher than the voice level. Additional embodiments are discussed and include improvements which reduce the effects of ambient noise, howling, and line echo.

11 Claims, 4 Drawing Sheets

HANDS-FREE SPEAKING DEVICE WITH ECHO CANCELER

This is a continuation of application Ser. No. 08/415,981, filed Apr. 4, 1995 (now abandoned).

BACKGROUND OF THE INVENTION

1. FIELD OF THE INVENTION

The present invention relates to a hands-free speaking device with echo canceler which removes ambient noise.

2. DESCRIPTION OF THE RELATED ART

FIG. 5 illustrates an example of a configuration of a conventional hands-free speaking device. Referring to the same figure, the hands-free speaking device comprises a received speech signal speaker 51, a speech transmitting signal microphone 52, a speech transmitting side output terminal 53, a received speech side input terminal 54, an acoustic echo canceler 55, a line echo canceler 56, and a 2-line/4-line converter 57. The acoustic echo canceler 55 eliminates acoustic echo 62 which passes around from the received speech signal speaker 51 to the speech transmitting signal microphone 52. The line echo canceler 56 eliminates line echo 60 which passes around from the speech transmitting side output terminal 53 the received speech side input terminal 54. The 2-line/4-line : converter 57 is a hybrid transformer or the like.

Next, the operation will be described. After the received speech signal has been input to the received speech side input terminal 54 through the 2-line/4-line converter 57, it is output to the received speech signal speaker 51 and input as a reference signal to the acoustic echo canceler 55. On the other hand, in addition to voice 61 of the user at the near side, acoustic echo 62 from the received speech signal speaker 51 as well as ambient noise 63 at the near side are input to the speech transmitting signal microphone 52. Since this acoustic echo 62 is an impediment to speaking, the acoustic echo canceler 55 computes pseudo-echo based on the received speech signal and removes the computed pseudo-echo from the speech transmitting signal to eliminate acoustic echo 62.

The speech transmitting signal is output through the 2-line/4-line converter 57 and input as a reference signal to the line echo canceler 56. A portion of the speech transmitting signal becomes line echo 60 which passes around from the speech transmitting side output terminal 53 to the received speech side input terminal 54 via the 2-line/4-line converter 57. Since the line echo 60 is an impediment to speaking, the line echo canceler 56 computes a pseudo-echo based on the speech transmitting signal and removes the computed pseudo-echo from the received speech signal to eliminate line echo 60.

Accordingly, simultaneous speaking in both directions is made possible by the acoustic echo canceler 55 which eliminates acoustic echo 62, and the line echo canceler 56 which eliminates line echo 60, to prevent howling from occurring.

However, the above-described conventional hands-free speaking device has the following problems.

First, since the path at the speech transmitting side is always open, the speaker at the far side constantly hears ambient noise 63 from the near side which enters the speech transmitting signal microphone 52, and which can be very irritating to the speaker at the far side.

Second, when there is ambient noise 63 at the near side, the capability of the acoustic echo canceler 55 to eliminate echo is reduced, which causes the acoustic echo 62 to return back to the far side. This reduces speech quality.

Third, where there is a sudden excessive input when the user is speaking, the acoustic echo canceler 55 cannot eliminate acoustic echo 62 completely. This causes the remaining echo to return back to the far side, thereby reducing speech quality. In addition, a loop is produced in the near side and far side of the acoustic path, which causes howling to occur.

Fourth, where the delay time of the line echo 60 is short (for example, 30 msec), only a small-scale memory with small capacity needs to be built in the line echo canceler 56 to compute pseodo-echo. As the delay time of the line echo 60 increases, however, memory capacity needs to be increased, thereby increasing costs.

SUMMARY OF THE INVENTION

The present invention intends to overcome the above-described problems by providing a hands-free speaking device with an echo canceler which is capable of reducing ambient noise influences produced at the near side, and preventing a reduction in the echo eliminating capability of the acoustic echo canceler when there is ambient noise at the near side. This improves the clarity of the speech in the presence of noise, and permits low cost line echo elimination.

To these ends, the invention provides a hands-free speaking device comprising a speaker for reproducing a received speech signal, a microphone for outputting a speech transmitting signal, an echo canceler for eliminating echo transmitted from the speaker to the microphone, a voice detector for monitoring the speech transmitting signal level at the output end of the echo canceler, and an attenuator for attenuating the speech transmitting signal based on the output of the voice detector.

DESCRIPTION OF THE PREFERRED EMBODIMENTS

First Embodiment

Figure 1:
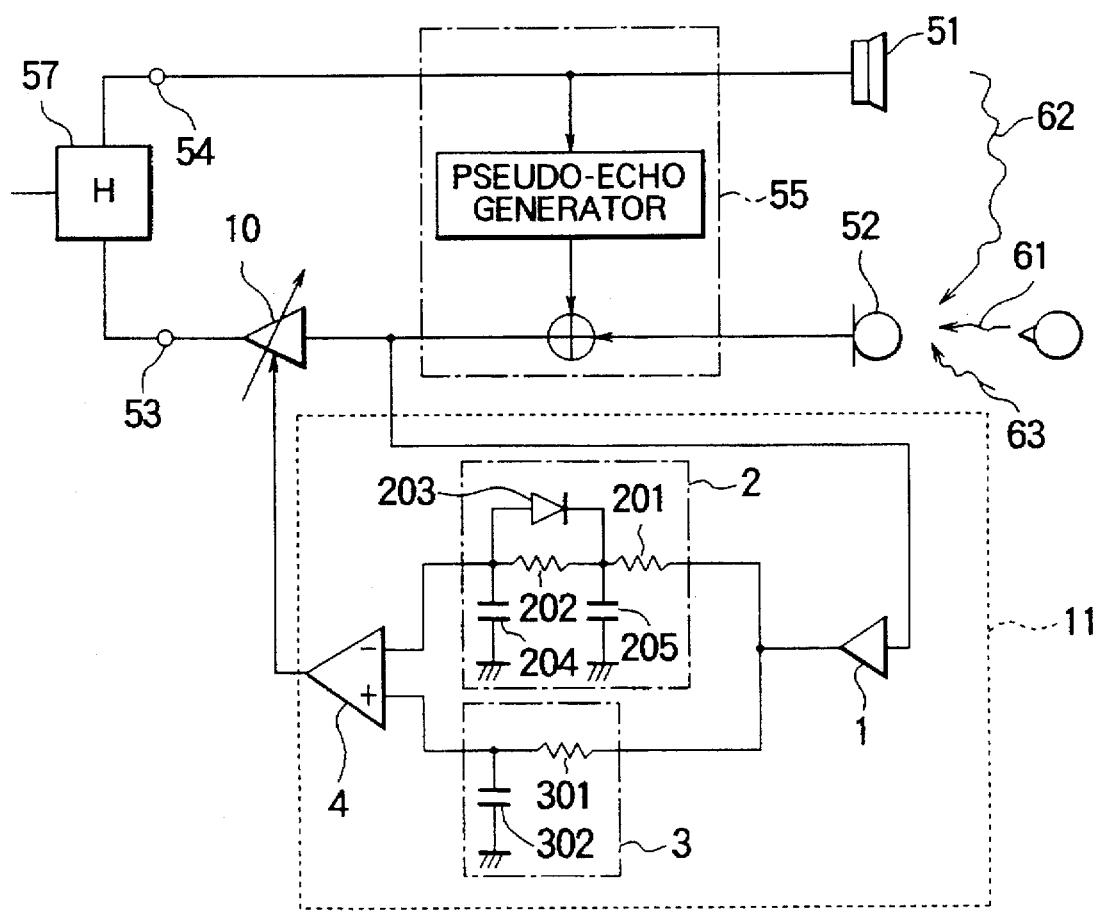
FIG. 1 is a functional block diagram of a hands-free speaking device of the first embodiment of the present invention.

One embodiment of the present invention will be described below with reference to the drawings. FIG. 1 shows the configuration of a hands-free speaking device of the first embodiment. Referring to the same figure, the hands-free speaking device comprises an attenuator 10, a voice detector 11, a received speech signal speaker 51, a speech transmitting signal microphone 52, a speech transmitting side output terminal 53, a received speech side input terminal 54, an acoustic echo canceler 55, and a 2-line/4-line converter 57. The attenuator 10 attenuates the speech transmitting signal based on the output Of the voice detector 11. The acoustic echo canceler 55 eliminates acoustic echo 62 which passes around from the received speech signal speaker 51 to the speech transmitting signal microphone 52. The 2-line/4-line converter 57 is a hybrid transformer or the like.

The voice detector 11 comprises a rectifying circuit for converting A.C. speech transmitting signals to D.C. speech transmitting signals, a noise level monitoring circuit 2 for detecting the noise level based on the D.C. signal output from the rectifying circuit 1, a voice level monitoring circuit 3 for detecting the voice level based on the D.C. signal, and a comparator 4 for comparing the noise level with the voice level.

The noise level monitoring circuit 2 comprises a resistor 201 for inputting the rectifying circuit 1 output, a resistor 202 with one end connected to the resistor 201 and the other end being the output end, a diode 203 which is connected in parallel to the resistor 202, a capacitor 205 with one end connected to the output end of the resistor 201 and the other end grounded, and a capacitor 204 with one end connected to the output end of the resistor 202 and the other end grounded.

The voice level monitoring circuit 3 comprises a resistor 301 and a capacitor 302, which is a low-pass filter.

Next, the operation will be described. Voice 61 of the speaker is converted into transmitting signals by the speech transmitting signal microphone 52. After the acoustic echo 62 which passes around from the received speech signal speaker 51 to the speech transmitting signal microphone 52 has been eliminated by the acoustic echo canceler 55, the speech transmitting signal is input to the attenuator 10 and the voice detector 11. The speech transmitting signal comprises the voice 61 signal of the user at the near side and the ambient noise 63 signal at the near side.

The speech transmitting signal input to the voice detector 11 is first converted by the rectifying circuit 1 from an A.C. signal to a D.C. signal. The D.C. signal is input to the noise level monitoring circuit 2 and the voice level monitoring circuit 3.

The noise level monitoring circuit 2 monitors the noise level, which changes regularly, based on the rectifying circuit 1 output. More specifically, the circuit comprising the resistor 201, the resistor 202, the capacitor 204, and the capacitor 205 has a slow rise characteristic (for example 2 to 3 seconds). The circuit comprising the resistor 201, the diode 203, and the capacitors 204 and 205 has a fast fall characteristic (for example 0.1 seconds). The monitored noise level is output to the comparator 4.

The voice level monitoring circuit 3 has either a fast rise or fall characteristic (for example a few milliseconds) for the rectifying circuit 1 output, and monitors the level of voice 61 which changes irregularly. The voice level is output to the comparator 4.

The comparator 4 compares the outputs of the noise level monitoring circuit 2 with the voice level monitoring circuit 3. When the voice level is higher than the noise level, the comparator 4 outputs a high level signal, while it outputs a low level signal when the voice level is lower than the noise level. The output signal of the comparator 4 becomes a control signal in the attenuator 10.

In the attenuator 10, when the control signal is at a high level, the gain is 0 dB (no attenuation), and when the control signal is at a low level, the gain is negative (for example −15 dB). Therefore, controlling the attenuator 10 based on the detected results of the voice detector 11 allows the signal to be transmitted to the far side without attenuation of the speech transmitting signal microphone 52 output, when the level of irregularly changing signals such as voice is higher than that of regularly changing signals such as noise. On the other hand, when the voice signal level is less than the noise signal level, the output of the speech transmitting signal microphone 52 is attenuated before signal transmission to the far side.

As described above, in the first embodiment of the hands-free speaking device, an attenuator is inserted in the channel when the level of a regularly changing signal such as noise is higher than that of an irregularly changing signal such as voice. On the other hand, when the level of the irregularly changing signal is higher, the attenuator is released, which opens the path. This allows the path at the speech transmitting side to be opened or closed when necessary, so that even when there is a high ambient noise level at the near side, the speaker at the far side cannot hear it, making it very easy for the speaker at the far side to hear the voice.

Second Embodiment

Figure 2:
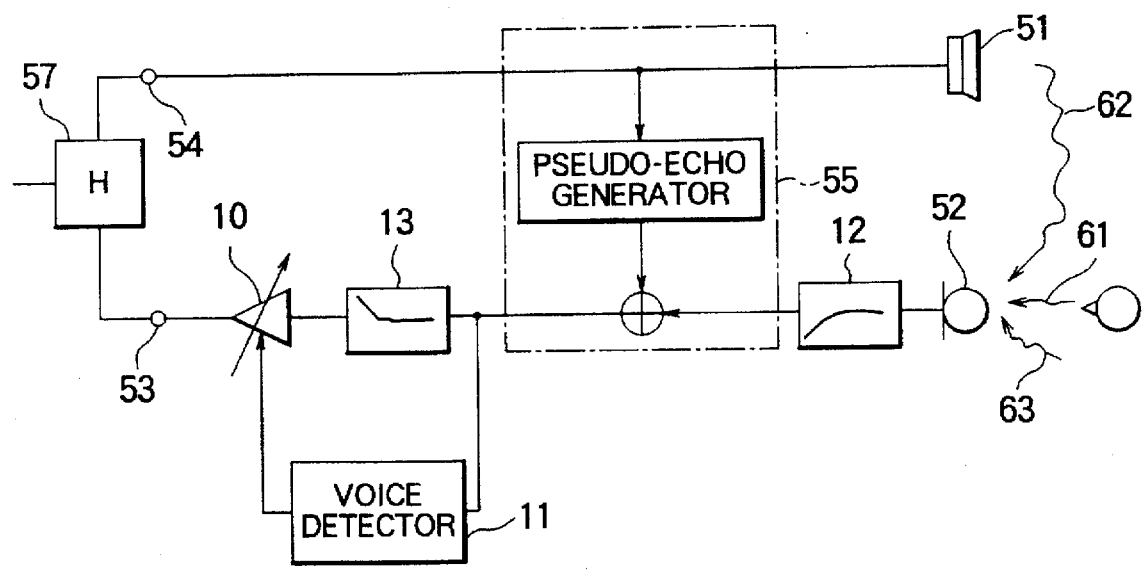
FIG. 2 is a functional block diagram of a hands-free speaking device of the second embodiment of the present invention.

Next, the second embodiment of the hands-free speaking device will be described with reference to FIG. 2. FIG. 2 illustrates a configuration of the hands-free speaking device of the second embodiment. Referring to the same figure, this hands-free speaking device comprises an attenuator 10, a voice detector 11, a high-pass filter 12, a low-pass filter 13, a received speech signal speaker 51, a speech transmitting signal microphone 52, a speech transmitting side output terminal 53, a received speech side input terminal 54, an acoustic echo canceler 55, and a 2-line/4-line converter 57.

The high-pass filter 12 attenuates the low-frequency component in the speech transmitting signal generated from the speech transmitting signal microphone 52. The high-frequency component alone is passed through the filter and output to the acoustic echo canceler 55. The low-pass filter 13 attenuates the high-frequency component in the output of the acoustic echo canceler 55, and passes the low-frequency component alone, which is output to the attenuator 10. The attenuator 10, the voice detector 11, the received speech signal speaker 51, the speech transmitting signal microphone 52, the speech transmitting side output terminal 53, the received speech side input terminal 54, the acoustic echo canceler 55, and the 2-line/4-line converter 57 are the same as those illustrated in FIG.

Next, the operation of the second embodiment will be described. A high ambient noise 63 level at the near side reduces the S/N ratio of the acoustic echo 62 input into the speech transmitting signal microphone 52. With the S/N ratio reduced, it is difficult to completely eliminate the acoustic echo 62 by the acoustic echo canceler 55. The spectrum of the ambient noise 63 at the near side is primarily concentrated in the low frequency region. If the low frequency component is removed before the signal reaches the acoustic echo canceler 55, the S/N ratio of the acoustic echo is increased, so that the acoustic echo 62 is sufficiently removed.

The speech transmitting signal from the speech transmitting signal microphone 52 is first input to the high-pass filter 12 (having a cut-off frequency of 1 kHz, for example). After the low frequency component of ambient noise 63 at the near side has been removed, the resulting signal is output to the acoustic echo canceler 55. As described above, since the ambient noise 63 at the near side is concentrated in the low-frequency region, the ambient noise 63 is almost totally eliminated by the high-pass filters. This increases the S/N ratio of the acoustic echo 62, so that more of it is eliminated.

The output of the acoustic echo canceler 55 is input into the voice detector 11. The voice detector 11 and the attenuator 10 operate in the same manner as those of the first embodiment. At the same time, the output of the acoustic echo canceler 55 is input into the low-pass filter 13 which has frequency characteristics exactly opposite those of the high-pass filter 12. That is, the low-pass filter 13 compensates for the low-frequency component which is attenuated by the high-pass filter 12, so that it functions to balance the low-frequency component back again with the unattenuated high-frequency component. By passing the signal through the low-pass filter 13, the effects of the high-pass filter 12 on the frequency characteristics of the speech transmitting signal are eliminated, with the result that the characteristics are the same as before the signal passed the high-pass filter 12. The signal is output to the attenuator 10.

According to the hands-free speaking device of the second embodiment, a high-pass filter is provided at a place before the signal reaches the acoustic echo canceler to remove the ambient noise at the near side, so that even when there is ambient noise at the near side, the S/N ratio of the acoustic echo is increased, with the result that the capability of the acoustic echo canceler to eliminate echo is increased, thereby improving speech quality.

Since a low-pass filter having frequency characteristics opposite to those of the high-pass filter is provided at a place following the acoustic echo canceler, the effects of the high-pass filter on the speech transmitting signal can be compensated for, so that the speech quality is not affected thereby.

Third Embodiment

Figure 3:
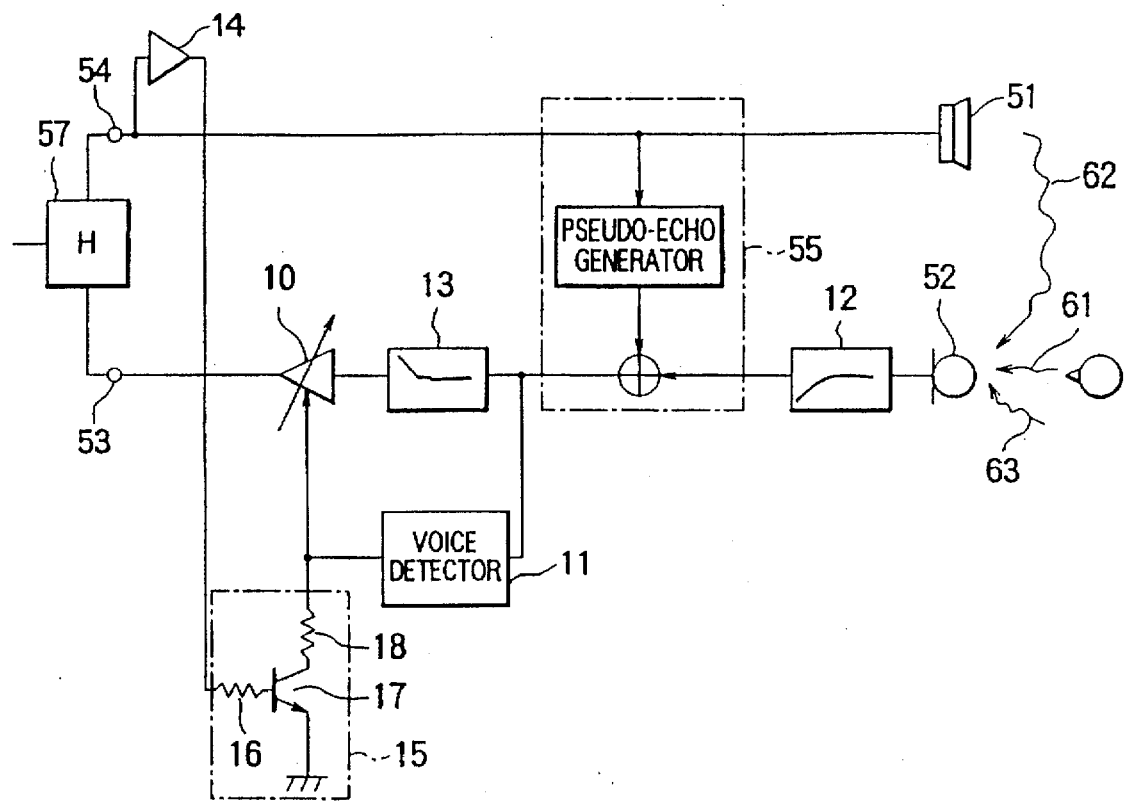
FIG. 3 is a functional block diagram of a hands-free speaking device of the third embodiment of the present invention.

Next, the third embodiment of the hands-free speaking device will be described with reference to the figures. FIG. 3 illustrates a configuration of the hands-free speaking device of the third embodiment. Referring to the same figure, the hands-free speaking device comprises an attenuator 10, a voice detector 11, a high-pass filter 12, a low-pass filter 13, an amplifier 14, an attenuator control circuit 15, a received speech signal speaker 51, a speech transmitting signal microphone 52, a speech transmitting side output terminal 53, a received speech side input terminal 54, an acoustic echo canceler 55, and a 2-line/4-line converter 57.

The amplifier 14 amplifies the received speech signal. The attenuator control circuit 15 attenuates the control signal in the attenuator 10 based on the amplifier 14 output. The attenuator control circuit 15 comprises a transistor 17, a resistor 16 for supplying the amplifier 14 output to the base of the transistor 17, and a resistor 18 for controlling the attenuator 10 control signal by using the transistor 17 output.

In the same figure, the attenuator 10, the voice detector 11, the high-pass filter 12, the low-pass filter 13, the received speech signal speaker 51, the speech transmitting signal microphone 52, the speech transmitting side output terminal 53, the received speech side input terminal 54, the acoustic echo canceler 55, and the 2-line/4-line converter are the same as those illustrated in FIG. 2.

Next, the operation will be described. When the received speech signal is excessive, or when the signal is transiently input from the received speech side input terminal 54, the acoustic echo canceler 55 is incapable of completely eliminating the acoustic echo. In this way, when the acoustic echo 62 is superimposed on the speech transmitting signal, the voice detecting circuit 11 incorrectly determines that the acoustic echo 62 is voice 61 and outputs a high level signal, so that no attenuation is carried out by the attenuator 10 (attenuation is 0 dB). This reduces the speech quality due to the effect of acoustic echo 62. The attenuator control circuit 15 of FIG. 3 is provided to reduce the acoustic echo 62 influence in this kind of situation.

The received speech signal amplified by the amplifier 14 is input to the base of the transistor 17 through the resistor 16. An excessive received speech signal turns the transistor 17 on and causes the control signal in the attenuator 10 to be at a low level. The attenuator 10 attenuates the speech transmitting signal in the output of the low-pass filter 13. Although a high level signal output from the voice detecting circuit 11 is also supplied to the control signal input of the attenuator 10, since the attenuator control circuit 15 has a higher drive capability, the control signal of attenuator 10 becomes low level.

According to the hands-free speaking device of the third embodiment, the acoustic echo can be eliminated even when the received speech signal is excessive. This is made possible by the provision of an attenuator control circuit which monitors the received speech signal level and controls the attenuator such that it increases the attenuation amount in accordance with this monitored signal level. In addition, howling can be suppressed when it occurs because the loop gain drops.

Fourth Embodiment

Figure 4:
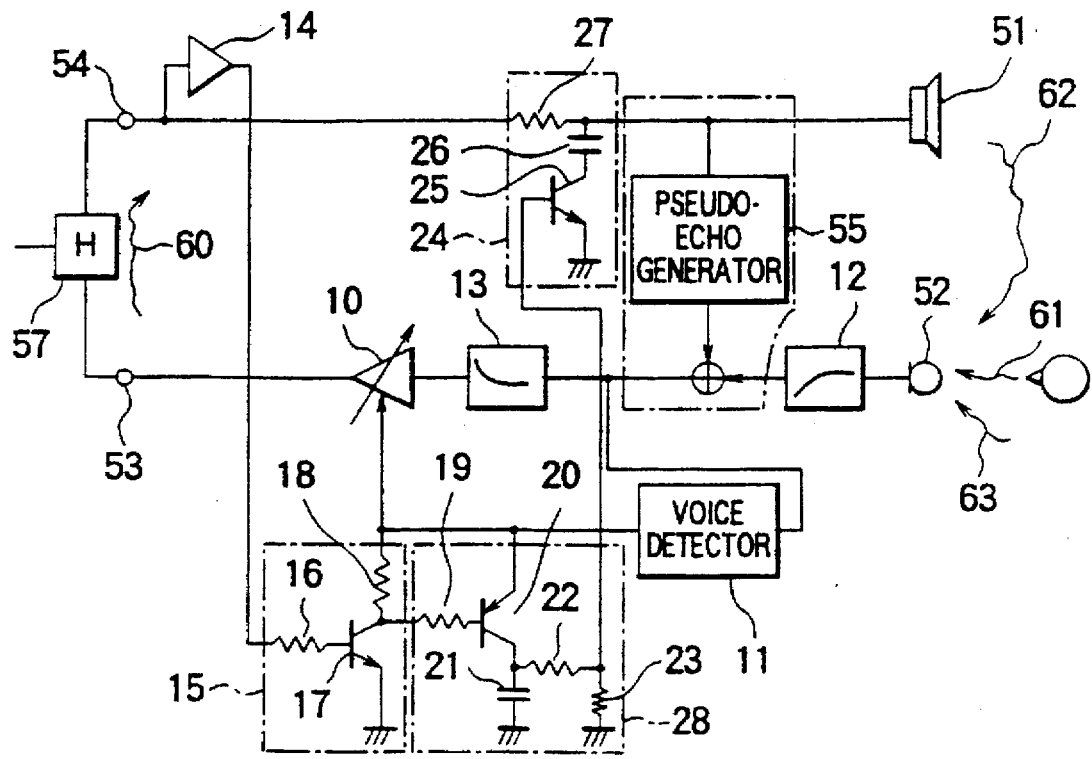
FIG. 4 is a functional block diagram of a hands-free speaking device of a fourth embodiment of the present invention.
Figure 5:
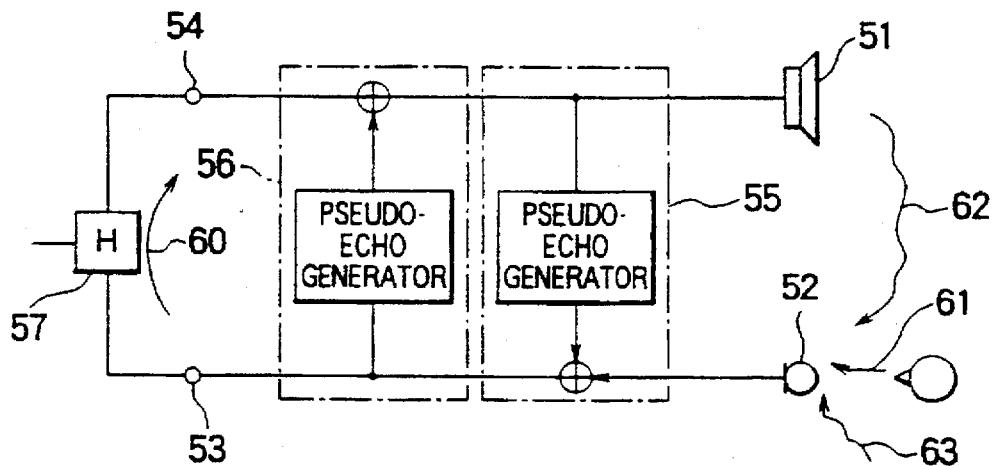
FIG. 5 is a functional block diagram of a conventional hands-free speaking device.

Next, the fourth embodiment of the invention will be described with reference to the drawings. FIG. 4 illustrates the configuration of the hands-free speaking device of the fourth embodiment of the invention. Referring to the same figure, this hands-free speaking device comprises an attenuator 10, a voice detector 11, a high-pass filter 12, a low-pass filter 13, an amplifier 14, an attenuator control circuit 15, a filter circuit 24, a filter control circuit 28, a received speech signal speaker 51, a speech transmitting signal microphone 52, a speech transmitting side output terminal 53, a received speech side input terminal 54, an acoustic echo canceler 55, and a 2-line/4-line converter 57.

The filter control circuit 28 causes the filter circuit 24 to operate to remove line echo when irregularly changing signals (for example voice) are present in the transmitting path and when the received speech signal level, in synchronization with the transmitting speech signal level, is excessively high. The filter control circuit 28 comprises a transistor 20, a resistor 19 for supplying the attenuator control circuit 15 output to the base of the transistor 20, a capacitor 21 connected to the collector of the transistor 20, and resistors 22 and 23. The filter circuit 24 operates based on the filter control circuit 28 and removes excessive signals from the received speech signal. The filter circuit 24 comprises a transistor 25 which turns on/off based on the filter control circuit 28 output, and a capacitor 26 and a resistor 27 which function as a low-pass filter circuit when the transistor 25 is on.

Referring to the same figure, the attenuator 10, voice detector 11, high-pass filter 12, low-pass filter 13, amplifier 14, attenuator control circuit 15, received speech signal speaker 51, speech transmitting signal microphone 52, speech transmitting side output terminal 53, received speech side input terminal 54, acoustic echo canceler 55, and 2-line/4-line converter 57 are the same as those illustrated in FIG. 3.

Next, the operation will be described. When an irregularly changing signal (for example voice) is present in the transmitting path, the voice detector circuit 11 outputs a high level signal. Then, if the line echo 60 level is high, the attenuator control circuit 15 receives the signal output from the amplifier 14, whereby its transistor 17 is turned on. The attenuator control circuit 15 output is then input to the filter control circuit 28. Since it is input to the base of the transistor 20 through the internal resistor 19, the transistor 20 of the filter control circuit 28 is turned on. After receiving the filter control circuit 28 output, the transistor 25 of the filter circuit 24 is turned on. This means that the low-pass filter, in the receiving path, made up of the capacitor 26 and resistor 27 is positioned between the received speech side input terminal 54 and the acoustic echo canceler 55 input. This allows the line echo 60 to be reduced, whereby malfunctioning of the acoustic echo canceler 55 and the occurrence of howling are prevented.

The operational characteristics of the low-pass filter made up of the capacitor 26 and resistor 27 can be adjusted by changing the values of the resistors 22 and 23 connected to the output terminal side of the transistor 20 of the filter control circuit 28 based on the voice detecting circuit 11 output level. The characteristics of the low-pass filter itself can be adjusted by changing the time constant which is achieved by changing the values of the capacitor 26 and resistor 27.

As described above, according to the fourth embodiment, a low-pass filter is inserted in the receiving path when there is an irregularly changing signal (for example voice) in the speech transmitting signal and the level of the received speech signal in synchronization with the speech transmitting signal is more than a certain level. This results in reduced line echo without employing the conventionally used line echo canceler comprising a memory. It also results in the prevention of howling by reducing the loop gain of the transmitting and receiving path.

When the speaker at the far side and the speaker at the near side speak simultaneously, there is no mutual relation between the transmitting and received signals, and the speech transmitting signal level and the received speech signal level do not synchronize. Therefore, simultaneous speaking in the transmitting and receiving directions is possible without inserting a low-pass filter in the receiving path.

In the aforementioned fourth embodiment, the voice detector 11, high-pass filter 12, low-pass filter 13, attenuator control circuit 15, filter control circuit 28, and the filter circuit 24 are all made up of analog circuits. Therefore, it is possible to construct them simply and reduce the costs of the circuit as compared to digital circuits used in memories or the like.

What is claimed is:

1. A hands-free speaking device comprising:
   a speaker for reproducing a received speech signal;
   a microphone for outputting a speech transmitting signal;
   an echo canceler for removing echoes transmitted from said speaker to said microphone;
   a voice detector for monitoring the speech transmitting signal level at the output end of said echo canceler;
   an attenuator for attenuating the speech transmitting signal based on the output of said voice detector, said attenuator independently receiving both the speech transmitting signal and an output of the voice detector so as to attenuate the speech transmitting signal based on the output of said voice detector; and
   said voice detector including a noise level monitoring circuit which monitors the ambient noise level input to said microphone, a voice level monitoring circuit which monitors the voice signal level input to said microphone, and a comparator which compares the output of said noise level monitoring circuit with that of said voice level monitoring circuit and generates a signal for changing the attenuation amount of said attenuator based upon the comparison.

2. A hands-free speaking device according to claim 1, wherein said comparator generates a signal for increasing the attenuation amount of said attenuator when the noise level is higher than the voice level.

3. A hands-free speaking device according to claim 2 further comprising a rectifying circuit for rectifying the speech transmitting signal at the output end of said echo canceler, wherein said voice detector monitors the speech transmitting signal level based on the output of said rectifying circuit.

4. A hands-free speaking device according to claim 2, wherein said noise level monitoring circuit has a slow rise characteristic and monitors regularly changing noise levels.

5. A hands-free speaking device according to claim 2, wherein said voice level monitoring circuit has a fast rise characteristic and monitors irregularly changing voice levels.

6. A hands-free speaking device according to claim 1 further comprising a high-pass filter for attenuating the low-frequency component in the speech transmitting signal output by said microphone, and a low-pass filter for attenuating the high-frequency component of the speech transmitting signal at the output end of said echo canceler.

7. A hands-free speaking device according to claim 6, wherein said high-pass filter and said low-pass filter have opposite frequency characteristics from each other.

8. A hands-free speaking device according to claim 1 further comprising an attenuator control means for controlling said attenuator based on the received speech signal level.

9. A hands-free speaking device according to claim 1 further comprising a filter control circuit for monitoring the levels of the irregularly changing signal in the speech transmitting signal and the received speech signal, and a filter circuit for inserting a low-pass filter in a receiving path based on the output of said filter control circuit.

10. A hands-free speaking device comprising:
    a speaker for reproducing a received speech signal;
    a microphone for outputting a speech transmitting signal;
    an echo canceler for removing echoes transmitted from said speaker to said microphone;
    a voice detector for monitoring the speech transmitting signal level at the output end of said echo canceler;
    an attenuator for attenuating the speech transmitting signal based on the output of said voice detector;
    a filter control circuit for monitoring the levels of the irregularly changing signal in the speech transmitting signal and the received speech signal; and
    a filter circuit for inserting a low-pass filter in the receiving path based on the output of said filter control circuit;
    wherein said filter control circuit causes said filter circuit to operate when an irregularly changing signal is present in a transmitting path and when there is an excessive received speech signal arising from synchronization with the speech transmitting signal level.

11. A hands-free speaking device comprising:
    a speaker for reproducing a received speech signal;
    a microphone for outputting a speech transmitting signal;
    an echo canceler for removing echoes transmitted from said speaker to said microphone;
    a voice detector for monitoring the speech transmitting signal level at the output end of said echo canceler;

an attenuator for attenuating the speech transmitting signal based on the output of said voice detector;

a filter control circuit for monitoring the levels of the irregularly changing signal in the speech transmitting signal and the received signal; and a filter circuit for inserting a low-pass filter in the receiving path based on the output of said filter control circuit;

wherein said filter circuit includes a transistor which operates based on the output of said filter control circuit and a low-pass filter made up of a resistor and capacitor, and wherein said transistor turns on/off the connection of said capacitor to turn, on/off said low-pass filter.

* * * * *